Patented Feb. 13, 1945

2,369,181

UNITED STATES PATENT OFFICE 2,369,181

CONTROLLED OXIDATION OF ALICYCLIC HYDROCARBONS AND OF THEIR DERIVATIVES

Frederick F. Rust and William E. Vaughan, Berkeley, Calif., assignors to Shell Development Company, San Francisco, Calif., a corporation of Delaware No Drawing. Application January 30, 1943, Serial No. 474,222

12 Claims. (Cl. 260—586)

This invention relates to the controlled, non-explosive oxidation of alicyclic hydrocarbons and of their halogenated derivatives containing a replaceable hydrogen atom, and more particularly pertains to the catalytic controlled oxidation of saturated alicyclic hydrocarbons. In one of its more specific embodiments, the present invention is directed to the treatment of saturated alicyclic hydrocarbons which may or may not contain saturated acyclic side chains attached thereto, to produce high yields of predetermined carboxylic acids, organic peroxides and/or ketones (including diketones) having the same number of carbon atoms per molecule as the starting organic material treated.

The oxidation of various hydrocarbons has been effected for a number of years both non-catalytically and in the presence of various catalysts. As a general rule, most if not all of these oxidations resulted in considerable decomposition of the hydrocarbons, i. e. cleavage of carbon-to-carbon bonds of the organic starting material. Also, the products of reaction of such oxidations contained various percentages of hydrocarbons which have been oxidized to a greater or lesser extent. For instance, the catalytic oxidation of paraffinic hydrocarbons in accordance with the teachings of the prior art, formed mixtures containing various percentages of carbon monoxide, carbon dioxide, olefins, water as well as some aldehydes, alcohols, acetals, esters, ketones and other oxygenated compounds. Similarly, the catalytic oxidation of aromatic hydrocarbons, e. g. toluene, in accordance with the teachings of the prior art frequently formed mixtures containing various percentages of saturated and unsaturated hydrocarbons, saturated and unsaturated aliphatic and aromatic aldehydes, ketones, lactones, alcohols and other oxygenated compounds, such as carbon dioxide. Furthermore, these various oxygenated compounds formed during the oxidation of various hydrocarbons according to the teachings of the prior art usually contained varied numbers of carbon atoms per molecule due to the carbon-to-carbon bond scission, as well as to other side reactions such as polymerization, condensation, and the like.

Although most of the oxygenated organic compounds formed as a result of the partial oxidations of hydrocarbons according to the known processes are generally more valuable than the primary materials subjected to the oxidation reaction, the subsequent fractionations of the reaction mixtures and the separate recovery of the individual compounds therefrom are frequently very difficult, if not commercially impossible, or at least greatly increase the cost of the final product or products. It is also freuqently desirable to obtain predominantly carboxylic acids, organic peroxides, and/or ketones rather than mixtures containing them and large amounts of other oxygenated compounds, e. g. carbon monoxide, carbon dioxide, aldehydes, alcohols, lactones, and the like. Furthermore, it is frequently important or at least desirable to obtain oxygenated compounds having at least the same number of carbon atoms per molecule as the starting organic material. In all such cases the previously known methods of partial oxidation of hydrocarbons, whether they be catalytic or non-catalytic, are impractical because of the partial or complete decomposition of the starting organic materials to form carbon and compounds containing fewer carbon atoms per molecule, as well as due to the above-mentioned formation of mixtures of compounds which are oxygenated to a greater or lesser degree.

It is therefore the main object of the present invention to avoid the above and other defects, and to provide a novel process whereby high yields of predetermined oxygenated organic compounds may be obtained. A further object of the invention is to provide a process for the production of high yields of carboxylic acids, ketones, alcohols, and/or organic peroxides to the substantial exclusion of other less desirable oxygenated organic compounds. A still further object is to provide a process whereby predetermined carboxylic acids, ketones, alcohols, and/or organic peroxides having the same number of carbon atoms per molecule as the starting material may be produced in economical yields to the substantial exclusion of other products of oxidation which are normally formed when hydrocarbons are subjected to partial oxidation in accordance with the processes of the prior art. Another object is to provide a novel process for the catalytic oxidation of alicyclic hydrocarbons (including those having acyclic substituents) and/or of their partially halogenated derivatives, to produce high yields of alicyclic carboxylic acids, ketones, alcohols and/or organic peroxides, to the substantial exclusion of oxygenated compounds having a lesser number of carbon atoms per molecule than present in the alicyclic compound subjected to treatment. Still other objects of the present invention will become apparent from the following description. The term "ketone" as employed herein and in the appended claims refers to organic compounds containing one or more ketonic carbonyl groups, and therefore includes diketones.

It has now been discovered that the above and other objects may be attained by effecting the partial and controlled oxidation in the presence of hydrogen bromide employed as a catalyst. More specifically stated, the invention resides in the controlled, non-explosive oxidation of alicyclic hydrocarbons, particularly of saturated alicyclic hydrocarbons, and of their partially halogenated derivatives, in the presence of a catalyst consisting of or comprising hydrogen bromide, or of a compound capable of yielding hydrogen bromide under the operating conditions. In one of its more specific embodiments the invention resides in the production of alicyclic carboxylic acids, ketones, alcohols and/or peroxides by the controlled oxidation of alicyclic hydrocarbons, especially saturated alicyclic hydrocarbons, or of products of their partial halo-substitution, this oxidation being effected by subjecting the abovementioned and hereinbelow more fully described class of alicyclic compounds to the action of oxygen or of an oxygen-containing or oxygen-yielding material, in the presence of hydrogen bromide or a substance capable of yielding hydrogen bromide under the operating conditions, and at temperatures and pressures which are below those capable of causing spontaneous combustion, and, therefore, resultant decomposition of the carbon structure of the starting organic material.

The above-outlined invention is predicated on the discovery that the presence of hydrogen bromide during the oxidation of the defined class of organic compounds controls the oxidation reaction so that oxidation occurs on the carbon atom or atoms to which a halogen atom would normally attach itself if the starting organic material were subjected to a halo-substitution reaction. Furthermore, it has been found that the presence of hydrogen bromide, besides retarding the explosion or complete combustion of the organic starting material, has the effect of inhibiting decomposition of the carbon structure of such organic starting materials, so that the resultant oxygenated compounds contain the same number of carbon atoms per molecule as the starting organic material.

The following is a representative list of alicyclic hydrocarbons (which term includes the alkylated derivatives thereof) which may be oxidized in accordance with the process of the present invention: cyclopropane, cyclobutane, cyclopentane, cyclohexane, methyl cyclopentane, methyl cyclohexane, 1,2,4-trimethyl cyclohexane, 1,3,5-trimethyl cyclohexane, thujane, sabinene, carane, pinane, camphane, and the like and their homologues. Also, the products of partial halo-substitution of such alicyclic hydrocarbons, whether such halo-substitution be in the ring or in the alkyl chain or chains attached thereto, may be employed as the starting material. The process of the present invention, however, is particularly suitable for the controlled oxidation of the lower homologues, and especially of the lower saturated homologues, of these alicyclic compounds. Obviously, mixtures of these and like organic compounds may also be employed as the organic starting material.

It was stated above that the slow (i. e. non-explosive) controlled oxidation of the above-outlined class of organic compounds is effected in accordance with the present invention at temperatures which are below those at which spontaneous combustion or substantial decomposition of the carbon structure occurs. This upper temperature limit will at least in part depend on the specific organic substance treated, as well as on the proportions thereof and of the oxygen and hydrogen bromide present in the vaporous mixture subjected to the elevated temperatures. Generally speaking, this upper temperature limit is in the neighborhood of about 200° C. to 225° C. However, some of the more stable organic compounds of the defined class may be heated together with oxygen and hydrogen bromide to higher temperatures, e. g. about 250° C., and higher, particularly in the presence of inert diluents, without causing the mixture to decompose with the concurrent formation of high yields of carbon. In this connection it is to be noted that excessively high temperatures, even though they are below the explosive region, should be avoided because of certain undesirable side reactions such as excessive conversion of hydrogen bromide to organic bromides. This in itself is not detrimental because as stated, the organic bromides themselves may be treated in accordance with the present invention to form bromide-free oxygenated organic compounds and the corresponding hydrogen bromide (so that in effect at least a portion of the hydrogen bromide is regenerated and may be re-used). The excessive formation of organic bromides during the controlled oxidation of a given alicyclic hydrocarbon (or of its halogenated derivative), however, is undesirable because this decreases the catalyst concentration and may affect the yield or output of the desired oxygenated product or products. As stated, the upper temperature limit is generally in the neighborhood of about 200° C. to 225° C. However, with shorter contact periods this temperature may be raised above the mentioned limit. Some of the more readily oxidizable alicyclic compounds may be economically oxidized according to the present process at lower temperatures, e. g. between about 150° C. and about 175° C. With a further decrease in the operating temperature the output of product per unit time will decrease, so that at temperatures of below about 100° C. the controlled oxidation in the presence of the hydrogen bromide, or substances capable of yielding it under the operating conditions, may become uneconomical.

The reaction may be effected in the liquid or vapor phase, or in a two-phase liquid-vapor system. Since it is difficult to maintain a desirable relatively high oxygen concentration when the reaction is conducted in the liquid phase, it is generally preferable to effect the oxidation according to the present process in the vapor phase. Since some of the relatively higher boiling alicyclic hydrocarbons, which may or may not contain halogenated substituents, cannot be effectively maintained in the vapor phase and in contact with sufficient concentrations of oxygen and of hydrogen bromide without causing spontaneous combustion, the oxidation of such compounds may be readily effected in the presence of inert diluents such as steam, nitrogen, carbon dioxide, and even methane, which latter is relatively stable at temperatures at which other mentioned hydrocarbons, and their corresponding halogenated derivatives, may be oxidized according to the invention. Of the above diluents, the use of steam is believed to be most advantageous because the hydrogen bromide may then be removed from the reaction mixture as an overhead fraction in the form of its constant boiling mixture of hydrogen bromide and water.

Although the volumetric ratios of the organic starting material to the oxygen may vary within relatively wide limits, it may be stated that satisfactory yields of the desired oxygenated product or products can be obtained by using equivolumetric quantities thereof. An increase in the ratio of oxygen to the organic material in the treated mixture may increase the yield of the desired alicyclic carboxylic acids, organic peroxides and/or ketones. However, any undue increase in this ratio is generally dangerous because of excessive explosion hazards. On the other hand, the use of oxygen-to-hydrocarbon ratios which are considerably below equivolumetric will lower the output of the desired product per unit of time because of the presence of less oxygen per unit of space. This renders the process less economical. Nevertheless, the process is still operable, and, in fact it must be noted that a lowering of the oxygen-to-hydrocarbon or oxygen-to-organic halide ratio may cause a faster consumption of oxygen per unit of time. It was stated above that satisfactory yields of the desired oxygenated products may be obtained when equivolumetric mixtures of oxygen and of the specified organic starting material are subjected to the action of hydrogen bromide at the specified operating temperatures. Such mixtures usually present no hazards in so far as explosions are concerned, the hydrogen bromide apparently acting as an explosion retardant or inhibitor.

The amount of hydrogen bromide employed as the catalyst may also vary within relatively wide limits, although optimum amounts or percentages may be readily determined for each individual starting material treated and for the specific operating conditions employed. Generally speaking, the percentage of oxygen which will react to form the oxygenated products (other conditions being equal) will vary with the change in the hydrogen bromide concentration in the mixture subjected to treatment. When the hydrogen bromide concentration is varied from zero to about 20 per cent there is a proportional and noticeable change in the percentage of oxygen which reacts with the organic starting material. Increases in the volumetric or mol concentration of the hydrogen bromide above about 20%, however, do not have such a marked effect on the percentage of oxygen which will react. Nevertheless, very high hydrogen bromide concentrations will cause excessive dilution and thus decrease the output of the desired product or products. Such high concentrations should therefore be avoided for economic reasons.

The oxidation in accordance with the present process may be effected at atmospheric pressures, although higher or lower pressures may also be employed. In fact, it is generally preferable to employ super-atmospheric pressures because more of the mixture subjected to treatment may be present in or conveyed through a given unit of reaction space per unit time.

The invention may be executed in a batch, intermittent or continuous manner. When operating in a continuous system, all of the reactants, as well as the diluents, if diluents are used, and the catalyst may be first mixed together and the mixture may then be conveyed through the whole length of the reaction zone. In the alternative, it is possible to introduce at least a portion of the catalyst and/or of one or both of the reactants, i. e. oxygen and the organic material subjected to oxidation, at various intermediate points along the reaction zone. Such operation may be frequently desirable to control the operating conditions in the reaction zone. Generally, the contact time may vary within relatively wide limits and is at least in part dependent on the other operating conditions such as specific starting material, the ratios thereof to the oxygen and/or the catalyst, the presence or absence of inert diluents, the operating temperatures and pressures, etc. In a continuous system it has been found that satisfactory yields of the desired alicyclic carboxylic acids, alcohols, organic peroxides and/or ketones may be obtained with contact periods of between about one and about three minutes. Nevertheless, shorter or longer contact times may also be employed.

Instead of using pure or substantially pure oxygen for the oxidation in accordance with the process of the present invention it is also possible to employ oxygen-containing mixtures such as air, or even substances capable of yielding molecular oxygen under the operating conditions. Also, although the examples presented hereinbelow are directed specifically to the use of hydrogen bromide as the catalyst, the process of the present invention may also be realized by using substances capable of yielding hydrogen bromide under the operating conditions employed.

The invention is illustrated by the following examples which are presented herein for the purpose of clarifying the process of the present invention as well as the results and advantages derived therefrom. It is to be understood, however, that these examples are merely illustrative of the invention and should not be considered as limiting the invention in any sense.

*Example I*

The reactor consisted of a coil of glass tubing having an internal diameter of about 15 mm, and a volume of about 450 cc. This coil was immersed in an oil bath which permitted accurate control of the reaction temperature. A preheated vaporous mixture of cyclopentane, oxygen, nitrogen and hydrogen bromide (which substances were employed in a volumetric ratio of 2:2:2:1, respectively) was then conveyed at substantially atmospheric pressure through the above coil reactor at such a rate that the residence time was equal to about 3 minutes. The nitrogen was employed for the purpose of maintaining the cyclopentane in the vapor state. The temperature in the reactor was maintained at about 185° C. The effluent reaction mixture was conveyed into an aqueous sodium bicarbonate solution to neutralize the hydrogen bromide. The liquid reaction product contained a major amount of cyclopentanone, and it was found that between about 60% and about 70% of the introduced oxygen reacted to produce oxygenated products. It was also found that no reaction occurred when cyclopentane and oxygen were subjected, under the above-mentioned operating conditions, to a temperature of 185° C. in the absence of hydrogen bromide.

*Example II*

A vaporous mixture consisting of 2 parts by volume of cyclohexane, 2 parts by volume of oxygen, 2 parts by volume of nitrogen and 1 part by volume of hydrogen bromide was conveyed through the same reactor as that used in Example I. The residence time was equal to about 6 minutes, but the reaction temperature was raised to about 222° C. The effluent product was passed through and collected in water, and the liquid organic product thus produced was found to contain an appreciable amount of cyclohexanone. Also, diketones were found to be present in this reaction product. About 45% of the introduced oxygen reacted.

The reason for the relatively high temperature employed in the above run is because cyclohexane is quite resistant to oxidation. For instance, when the above reaction was repeated at a temperature of about 180° C. and with a residence time of about 3 minutes, substantially no oxygen was consumed. In fact, even at a temperature of about 196° C. and a residence time of about 3 minutes, the reaction was only 25% complete. On the other hand, at a temperature of about 227° C. there was considerable decomposition of the carbon structure of the cyclohexane, and large amounts of carbon dioxide, carbon monoxide and lower hydrocarbons were found in the reaction product.

As in the case with cyclopentane, no oxidation of cyclohexane was noticed when the reaction was attempted in the absence of hydrogen bromide even at temperatures considerably higher than those employed above for the oxidation in the presence of this catalyst.

We claim as our invention:

1. A process for the production of cyclopentanone which comprises subjecting a vaporous mixture containing cyclopentane and oxygen at substantially atmospheric pressure and at a temperature of above about 100° C. but below the temperature at which spontaneous combustion occurs, to the action of hydrogen bromide employed in an amount in excess of about 20 mol percent, effecting the reaction for a period of time sufficient to cause the controlled catalytic oxidation of the cyclopentane, and recovering cyclopentanone from the reaction mixture thus formed.

2. The process according to claim 1, wherein an inert diluent is employed to maintain the cyclopentane in the vaporous state.

3. A process for the production of cyclopentanone which comprises subjecting a vaporous mixture containing cyclopentane and oxygen to the action of hydrogen bromide at an elevated temperature which is below the spontaneous combustion temperature of the mixture, effecting said reaction for a period of time sufficient to cause the controlled catalytic oxidation of the cyclopentane, and recovering cyclopentanone from the reaction mixture thus formed.

4. A process for the production of cyclohexanone which comprises subjecting a substantially equivolumetric gaseous mixture of cyclohexane and oxygen at substantially atmospheric pressure and at an elevated temperature of below about 200° C. to the action of hydrogen bromide catalyst for a period of time sufficient to effect the controlled catalytic oxidation of the cyclohexane, and recovering cyclohexanone from the reaction mixture thus formed.

5. The process according to claim 4 wherein hydrogen bromide is employed in an amount which is in excess of about 20 mol percent.

6. A process for the production of ketones which comprises subjecting a vaporous mixture of cyclohexane and oxygen to the action of hydrogen bromide, at a temperature of between about 100° C. and the temperature at which spontaneous combustion occurs, effecting the reaction for a period of time sufficient to cause the controlled catalytic oxidation of the cyclohexane, and recovering the ketones from the reaction mixture thus formed.

7. A process for the production of oxygenated organic products which comprises subjecting a mixture of cyclohexane, oxygen and hydrogen bromide to the action of an elevated temperature of between about 100° C. and the temperature at which spontaneous combustion occurs, and effecting the reaction for a period of time sufficient to cause the controlled catalytic oxidation of the cyclohexane.

8. In a process for the controlled oxidation of alicyclic hydrocarbons, the steps of subjecting vapors of a saturated alicyclic hydrocarbon to the action of oxygen in the presence of hydrogen bromide and effecting the reaction at a temperature of between about 100° C. and the temperature at which spontaneous combustion and the resultant decomposition of the organic compound will occur.

9. The process according to claim 8 wherein the saturated alicyclic hydrocarbon and oxygen are employed in substantially equivolumetric proportions.

10. In a process for the controlled oxidation of alicyclic hydrocarbons, the steps of subjecting vapors of saturated alicyclic hydrocarbon to the action of oxygen in the presence of hydrogen bromide and at a temperature of between about 100° C. and the temperature at which spontaneous combustion and the resultant decomposition of the organic compound to carbon will occur, and continuing said reaction for a period of time sufficient to effect a substantial reaction between said saturated alicyclic hydrocarbon and the oxygen.

11. In a process for the controlled oxidation of organic compounds, the step of subjecting vapors of an organic compound selected from the group consisting of alicyclic hydrocarbons and of their products of partial halogenation to the action of oxygen in the presence of hydrogen bromide and at a temperature of between about 100° C. and the temperature at which spontaneous combustion and the resultant decomposition of the organic compound to carbon will occur.

12. In a process for the controlled oxidation of organic compounds, the step of subjecting an organic compound selected from the group consisting of alicyclic hydrocarbons and of their products of partial halogenation to the action of oxygen and of hydrogen bromide at a temperature of between about 100° C. and the temperature at which spontaneous combustion and the resultant decomposition of the carbon structure of the starting organic compound occurs.

FREDERICK F. RUST.
WILLIAM E. VAUGHAN.